(12) United States Patent
Machani (10) Patent No.: US 9,043,605 B1
(45) Date of Patent: May 26, 2015

(54) ONLINE AND OFFLINE VALIDATION OF TOKENCODES

(71) Applicant: EMC Corporation, Hopkinton, MA (US)

(72) Inventor: Salah Machani, Thornhill (CA)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/031,628

(22) Filed: Sep. 19, 2013

(51) Int. Cl.
*G06F 21/34* (2013.01)
*G06F 21/31* (2013.01)

(52) U.S. Cl.
CPC ............. *G06F 21/31* (2013.01); *G06F 21/34* (2013.01)

(58) Field of Classification Search
None
See application file for complete search history.

(56) References Cited

U.S. PATENT DOCUMENTS

| 7,984,491 | B2* | 7/2011 | Ueda et al. .................. 726/6 |
| 8,132,020 | B2* | 3/2012 | Zhu et al. .................. 713/185 |
| 8,683,562 | B2* | 3/2014 | Ting et al. .................. 726/6 |
| 8,689,294 | B1* | 4/2014 | Thakur et al. .................. 726/4 |
| 8,875,264 | B2* | 10/2014 | Tamai et al. .................. 726/6 |
| 2006/0015725 | A1* | 1/2006 | Voice et al. .................. 713/168 |
| 2013/0227677 | A1* | 8/2013 | Pal et al. .................. 726/19 |
| 2013/0283361 | A1* | 10/2013 | Rao et al. .................. 726/7 |

* cited by examiner

*Primary Examiner* — Minh Dinh
(74) *Attorney, Agent, or Firm* — Ryan, Mason & Lewis, LLP (57) ABSTRACT

An apparatus comprises a processing device configured to receive a request for access to a given protected resource, to receive a tokencode for validating the request for access to the given protected resource, to determine whether the processing device is connected to a network, to send the tokencode to a remote server over the network for validation responsive to determining that the processing device is connected to the network, and to validate the tokencode in the processing device to access the given protected resource responsive to determining that the processing device is not connected to the network.

20 Claims, 5 Drawing Sheets

ONLINE AND OFFLINE VALIDATION OF TOKENCODES

FIELD

The present invention relates generally to cryptography, and more particularly to validation of tokencodes.

BACKGROUND

Various techniques exist for accessing protected resources using processing devices. Such techniques include the use of tokencodes for validating or authenticating to a device or server containing protected resources. Conventional techniques include pre-loading a device with data files which contain a list or set of tokencodes such as pre-calculated one-time passwords. Such data files need to be updated every day, week, month, etc. to remain fresh, as the pre-calculated tokencodes typically expire after some period of time.

SUMMARY

Illustrative embodiments of the present invention provide for online and offline validation of tokencodes.

In one embodiment, an apparatus comprises a processing device configured to receive a request for access to a given protected resource, to receive a tokencode for validating the request for access to the given protected resource, to determine whether the processing device is connected to a network, to send the tokencode to a remote server over the network for validation responsive to determining that the processing device is connected to the network, and to validate the tokencode in the processing device to access the given protected resource responsive to determining that the processing device is not connected to the network.

In another embodiment, a method performed by a processing device comprises receiving a request for access to a given protected resource, receiving a tokencode for validating the request for access, determining whether the processing device is connected to a network, sending the tokencode to a remote server for validation responsive to determining that the processing device is connected to the network, and validating the tokencode in the processing device responsive to determining that the processing device is not connected to the network.

These and other features and advantages of embodiments of the present invention will become more readily apparent from the accompanying drawings and the following detailed description.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "tokencode" as used herein is intended to include information which may be utilized for cryptographic authentication purposes, and includes by way of example one-time passcodes (OTPs) and other types of passcodes. Although illustrative embodiments are described below primarily in the context of OTPs, it is to be appreciated that the invention is more broadly applicable to any other type of tokencode.

The term "token" as used herein is intended to be construed broadly, and includes tokens implemented in hardware, software and combinations of hardware and software. Tokens include, by way of example, authentication tokens, dongles, smartcards, key fobs, tags, smartwatches, other wearable devices with an embedded processing device, etc.

Hardware authentication tokens are typically implemented as small, hand-held devices that display a series of passcodes over time. A user equipped with such an authentication token reads the currently displayed passcode and enters it into a computer or other element of an authentication system as part of an authentication operation. The display may also present one or more quick response (QR) codes on the display. This type of dynamic passcode arrangement offers a significant security improvement over authentication based on a static password. Software authentication tokens, or software authenticators, can be implemented in the form of software installed on a processing device such as a computer, mobile phone, tablet, etc. In some devices, tokens can be implemented in hardware-based secure execution environments, as will be described in further detail below. Authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other types of authentication tokens include hybrid time-synchronous and event-synchronous tokens. In some embodiments, tokens utilize a randomly generated server challenge, a user secret, location information, etc. in addition to or in place of time and/or counter values for generating passcodes.

Passcodes can be communicated directly from the authentication token to a computer or other element of a communication system, instead of being displayed to the user. For example, a wired connection such as a universal serial bus (USB) interface may be used for this purpose. Wireless authentication tokens are also known. In authentication tokens of this type, the passcodes are wirelessly communicated to a computer or other element of an authentication system. Wireless authentication tokens may use near field communication (NFC), Bluetooth, WiFi direct and various other methods for transferring tokencodes wirelessly. These wired or wireless arrangements, also referred to herein as connected tokens, save the user the trouble of reading the passcode from the display and manually entering it into the computer or other processing device.

Hardware and software authentication tokens and other types of OTP devices are typically programmed with a random seed or other type of key that is also stored in a token record file. The record file is loaded into an authentication or validation server, such that the server can create matching passcodes for the authentication token based on the key and the current time or current event count.

As will be described, the present invention in one or more illustrative embodiments provides for online and offline validation of tokencodes. Tokencode validation may be utilized for accessing protected resources. Protected resources include, by way of example, applications, files or other data, other processing devices, etc.

Figure 1:
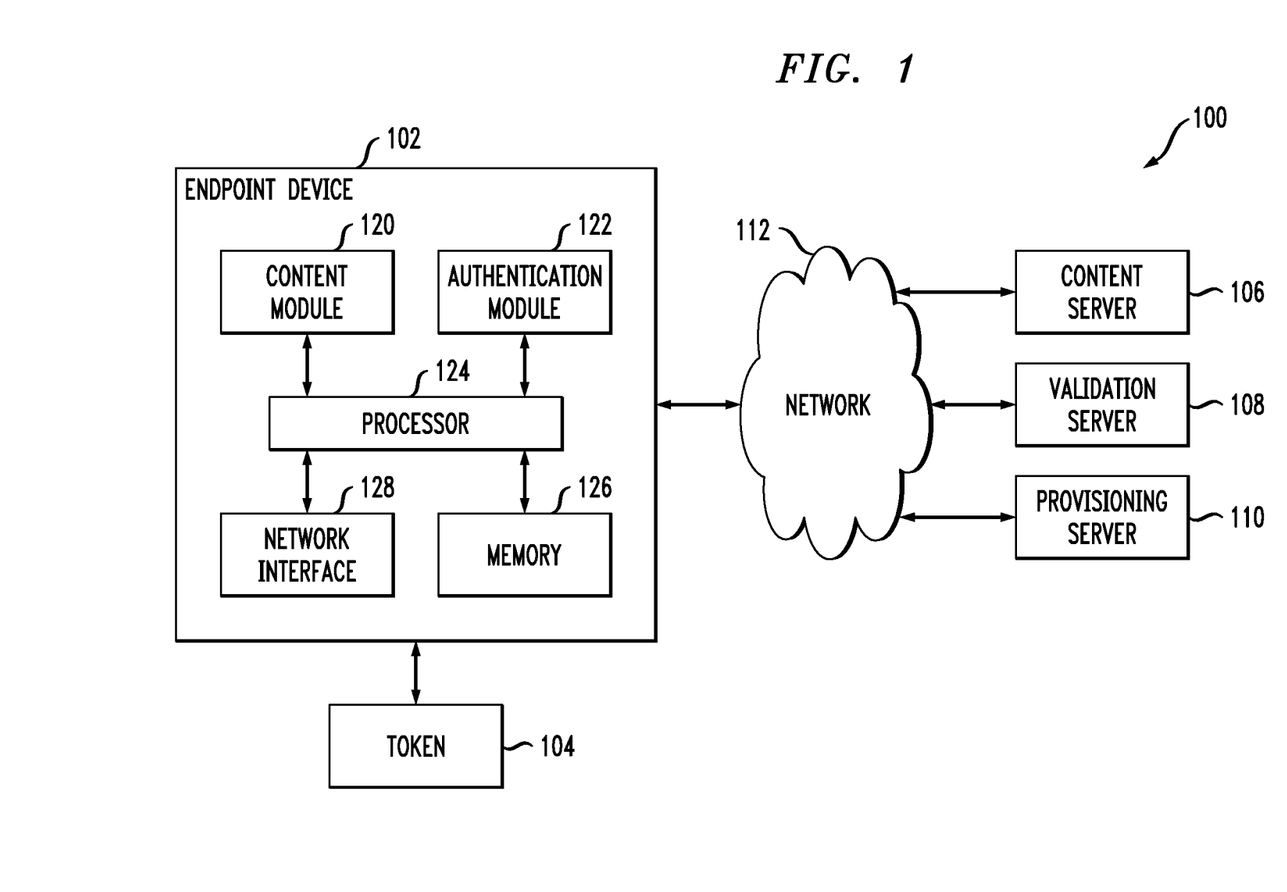
FIG. 1 is a block diagram of a communication system implementing tokencode validation in an illustrative embodiment of the invention.

FIG. 1 shows a communication system 100 that incorporates tokencode validation functionality in an illustrative embodiment. The system 100 comprises an endpoint device 102, token 104, content server 106, validation server 108 and provisioning server 110. The endpoint device 102, content server 106, validation server 108 and provisioning server 110 are configured to communicate over a network 112.

The endpoint device 102 may be implemented as a processing device such as a smartphone or other mobile telephone, a tablet, a laptop, a desktop computer, a smartwatch or other computing or processing device, etc.

As described above, the token 104 may be a connected token capable of communicating with the endpoint device 102 via a wired connection over a USB interface, a wireless connection over an NFC interface, a Bluetooth connection, etc.

The term "server" should be understood to encompass any type of processing device or set of such devices that is operative to perform functionality described herein with respect to content server 106, validation server 108 and/or provisioning server 110. A server need not be a network-based server, and may be implemented as a portion of a device that performs other functions, as a combination of multiple servers or other devices, or in other forms.

Content server 106 is operative to store one or more protected resources and/or data associated with one or more protected resources. Validation server 108 is operative to validate tokencodes. Content server 106 and validation server 108 are operative to communicate with one another, and pass tokencodes and validation or authentication information therebetween. In some embodiments, the content server 106 and validation server 108 may be a single remote server or run on a same processing platform. Provisioning server 110 is operative to provision keys to devices in the communication system 100, including endpoint device 102, token 104 and validation server 108.

The network 112 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The endpoint device 102 comprises a content module 120, authentication module 122, processor 124, memory 126 and a network interface 128.

The processor 124 may comprise a microprocessor, a microcontroller, an application-specific integrated circuit (ASIC), a field-programmable gate array (FPGA) or other type of processing circuitry, as well as portions or combinations of such circuitry elements. The memory 126 may comprise random access memory (RAM), read-only memory (ROM) or other types of memory, in any combination.

The memory 126 and other memories disclosed herein may be viewed as examples of what are more generally referred to as processor-readable storage media storing executable program code.

Also included in the endpoint device 102 is network interface 128. The network interface 128 allows the endpoint device 102 to communicate over the network 112 with the content server 106, validation server 108, and provisioning server 110. The network interface 128 may also allow endpoint device 102 to communicate with token 104 via a wired or wireless connection, such as an NFC connection of Bluetooth connection. The network interface 128 may comprise one or more conventional transceivers.

Content module 120 and authentication module 122 comprise functional modules which may be implemented via hardware, software or a combination of hardware and software to provide functionality to be described below.

Although not explicitly shown in FIG. 1, the content server 106, validation server 108, provisioning server 110 and token 104 may comprise respective processors, memories and network interfaces similar to the processor 124, memory 126 and network interface 128 of endpoint device 102, respectively.

It is to be appreciated that the particular set of elements shown in FIG. 1 in system 100 is presented by way of example, and in other embodiments additional or alternative elements may be used. Thus, another embodiment may include additional networks, servers, endpoint devices and tokens.

The system 100 may include additional or alternative processing platforms, as well as numerous distinct processing platforms in any combination, with each such platform comprising one or more computers, servers, storage devices or other types of processing devices. For example, content server 106, validation server 108 and provisioning server 110 may be implemented via one or more processing platforms.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

Figure 2:
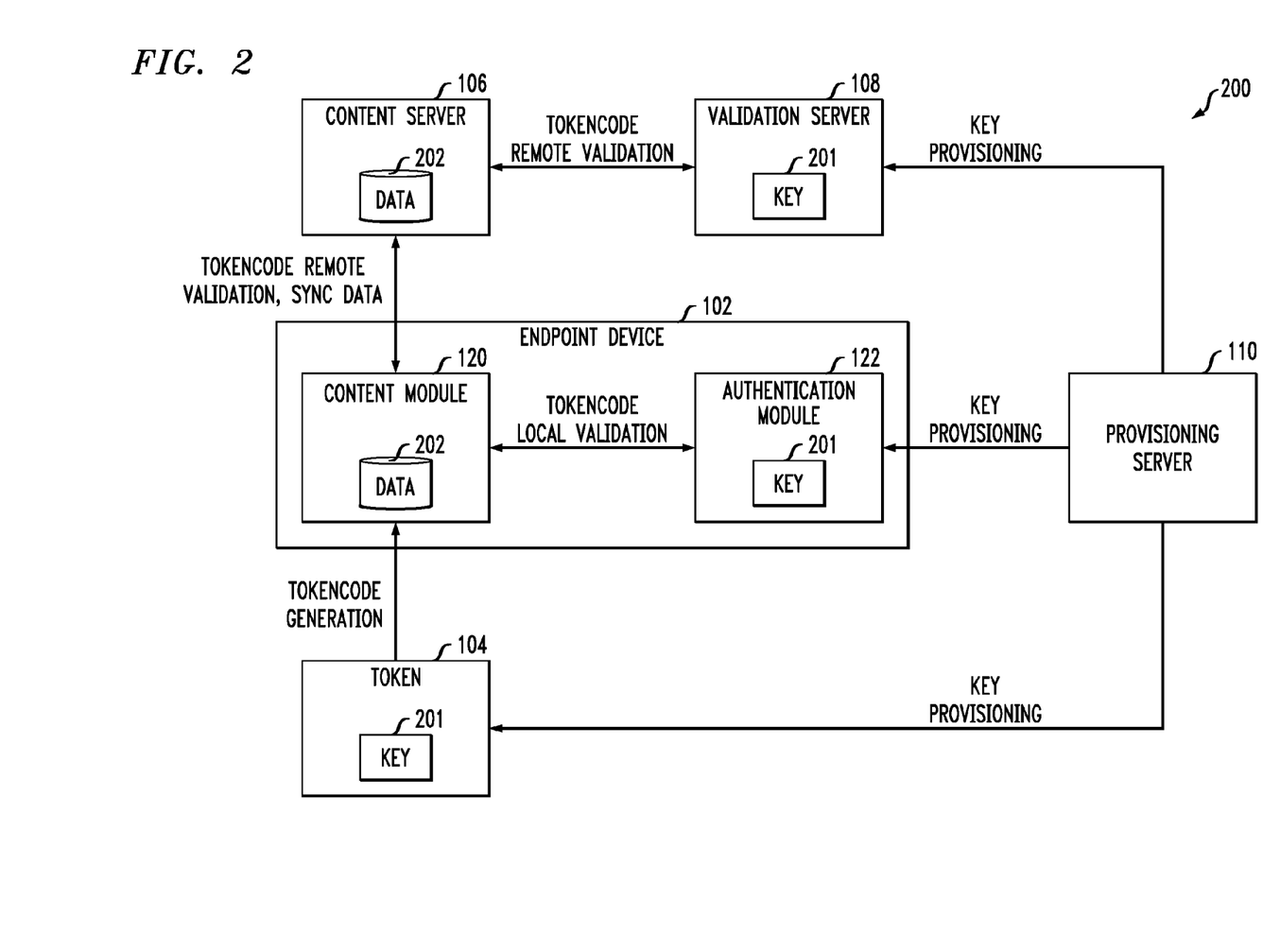
FIG. 2 illustrates an operating configuration of the communication system of FIG. 1 in an illustrative embodiment of the invention.

FIG. 2 shows an exemplary operating configuration 200 of communication system 100. The operating configuration 200 involves endpoint device 102, token 104, content server 106, validation server 108 and provisioning server 110.

The endpoint device 102 runs a content module 120 and an authentication module 122. The content module 120 may be a content or application container. The content module 120 stores data 202, which may include one or more protected resources and/or data associated with one or more protected resources. The content server 106 also stores data 202. The endpoint device 102 and content server 106 may synchronize data 202 when the endpoint device 102 is online and able to connect to the content server 106. Such synchronization may be based on a "push" method, whereby files or other content in data 202 are synched on creation, modification, or deletion rather than on a periodic basis. The synchronization may also be done periodically, such as every hour, day, week, etc. The synchronization may also be event-based. By way of example, data 202 may be synched each time the endpoint device 102 connects to network 112. It is to be appreciated that various other events, time periods and other techniques may be utilized for determining when to synchronize data 202.

The authentication module 122, which performs functions such as local tokencode validation, runs in a secure hardware and/or software environment. For example, if the endpoint device 102 is a personal computer, the authentication module 122 may run in a trusted platform module (TPM) of the personal computer. If the endpoint device 102 is a mobile device such as a smartphone or tablet, the authentication module 122 may run in a trusted execution environment (TEE). The TEE may comprise a secure processor or an embedded secure element. Examples of embedded secure elements include, by way of example, a Universal Integrated Circuit Card (UICC) such as a Subscriber Identity Module (SIM) card, a secure digital (SD) card with a secure element, a smartcard, etc. The TEE may run in TrustZone® security extensions of an ARM microprocessor or in Secure Enclave Tools of an Intel® microprocessor.

Provisioning server 110 is configured to provision key 201 in the validation server 108, in the authentication module 122 of endpoint device 102, and in the token 104. The key 201 may be utilized as a seed for tokencode generation, or may be used in conjunction with one or more additional cryptographic values or factors to generate tokencodes. The provisioning server 110 thus ensures that the same cryptographic key or seed is distributed and provisioned across the endpoint device 102, token 104 and validation server 108. It is important to note that in some embodiments a user may be associated with multiple endpoint devices. For example, a user may have a smartphone and a tablet. A user may have distinct tokens associated with the smartphone and tablet, or may utilize a single token for both the smartphone and the tablet. The provisioning server 110 can ensure that both the smartphone and the tablet have the same cryptographic key for use in tokencode generation.

In other embodiments, a single endpoint device may be a multi-user device. For example, a shared desktop computer may have multiple user accounts or profiles. Each user account may have its own unique key, and thus the provisioning server 110 provisions the multi-user device with multiple keys. The keys may be stored in different areas of a file system where access is controlled by an operating system of the device based on which user is currently logged in to the device. A multi-user endpoint device may alternatively have a number of secure environments associated with different users, where the keys for respective users are stored in different secure environments. Various other devices, such as tablets, smartphones and laptops, may similarly be multi-user devices.

In the operating configuration 200, the endpoint device 102 via the content module 120 receives a tokencode from the token 104. The token 104, as described above, may be a key fob, smartcard, NFC tag or other hardware form factor capable of generating and displaying or transferring tokencodes to the endpoint device 102 and client software running in the content module 120. The token 104 may transfer tokencodes via a wired or wireless interface as described above. In some embodiments, the token 104 may be another endpoint device. For example, the token 104 may be a software authenticator running on a user's smartphone where the endpoint device 102 is the user's tablet. The token 104 may generate tokencodes in response to a challenge from the endpoint device 102 or in response to a user pressing a button on the token or otherwise entering a command via one or more input methods including gestures. For example, the content module 120 may issue a challenge to token 104 on receiving a request for access to a protected resource.

In some embodiments, the challenge itself may be utilized in generating a tokencode. The challenge is an example of what is referred to herein as a moving factor. As will be described in further detail below, various moving factors including combinations of moving factors can be utilized for generating a tokencode. Moving factors include, by way of example, a current time value, a counter value, location information, etc.

It is to be appreciated that although FIG. 2 shows an operating configuration 200 in which the endpoint device 102 receives a tokencode generated by a token 104, embodiments are not limited solely to this arrangement. For example, in some embodiments an endpoint device itself generates tokencodes. An endpoint device may have multiple authentication modules running in different TPMs or TEEs, with tokencode generation and local tokencode validation occurring in separate authentication modules.

The endpoint device 102 is configured for online and offline tokencode validation. For example, on receiving a request for access to a protected resource, the endpoint device 102 determines whether a connection to network 112 is active or can be established.

If the endpoint device 102 is online (e.g., connected or is able to establish a connection to content server 106), the endpoint device 102 forwards a received tokencode to the content server 106 for validation. The content server 106 forwards the tokencode received from the endpoint device 102 to a validation server 108. The validation server 108, which is provisioned with key 201, validates the tokencode. The content server 106, on receiving an indication from the validation server 108 that the tokencode is valid, will grant the endpoint device 102 access to a protected resource. It is important to note that the functionality of content server 106 and validation server 108 may in some embodiments be performed by a single server or processing platform. The combination of content server 106 and validation server 108 may be referred to herein as a remote server.

When the endpoint device 102 is offline (e.g., not connected or is unable to establish a connection to the content server 106), the endpoint device 102 performs local tokencode validation. The content module 120 forwards the received tokencode to the authentication module 122. The authentication module 122, which is provisioned with key 201, validates the tokencode. The content module 120 grants access to the protected resource on receiving an indication from the authentication module 122 that the tokencode is valid.

Figure 3:
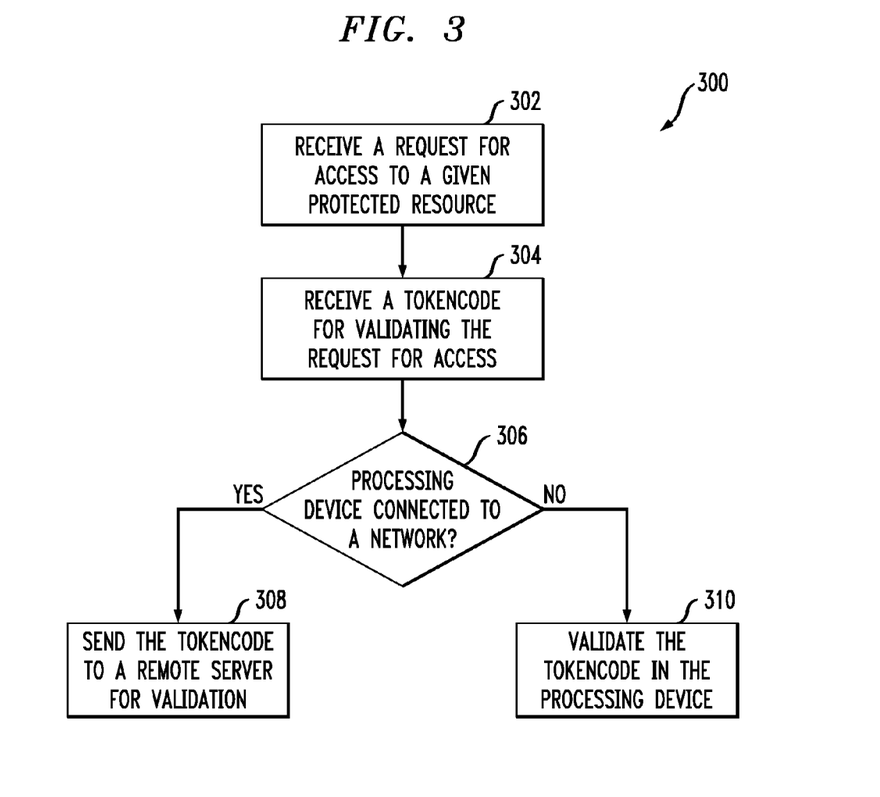
FIG. 3 illustrates a methodology for tokencode validation in an illustrative embodiment of the invention.

FIG. 3 illustrates a methodology 300 for tokencode validation. In step 302, a request is received for access to a given protected resource. The request may be received from a user of a processing device such as endpoint device 102, generated within an application running on the endpoint device 102 which requires access to a protected resource, etc. In some embodiments, the request is received from one or more other processing devices. Next, in step 304, a tokencode for validating the request for access is received. As described above, the tokencode can be received from a token, smartcard, NFC tag, key fob, or other processing device or generated by one or more modules within a given processing device.

In step 306, a determination is made as to whether the processing device is connected to a network. For example, the endpoint device 102 in communication system 100 determines whether it is connected to network 112, and thus the content server 106. If the processing device, such as endpoint device 102 in communication system 100, is connected to the network, the tokencode is sent 308 to a remote server for validation. The content server 106 and validation server 108 in communication system 100 are examples of remote servers. If the processing device is not connected to the network, the tokencode is validated 310 in the processing device.

Figure 4:
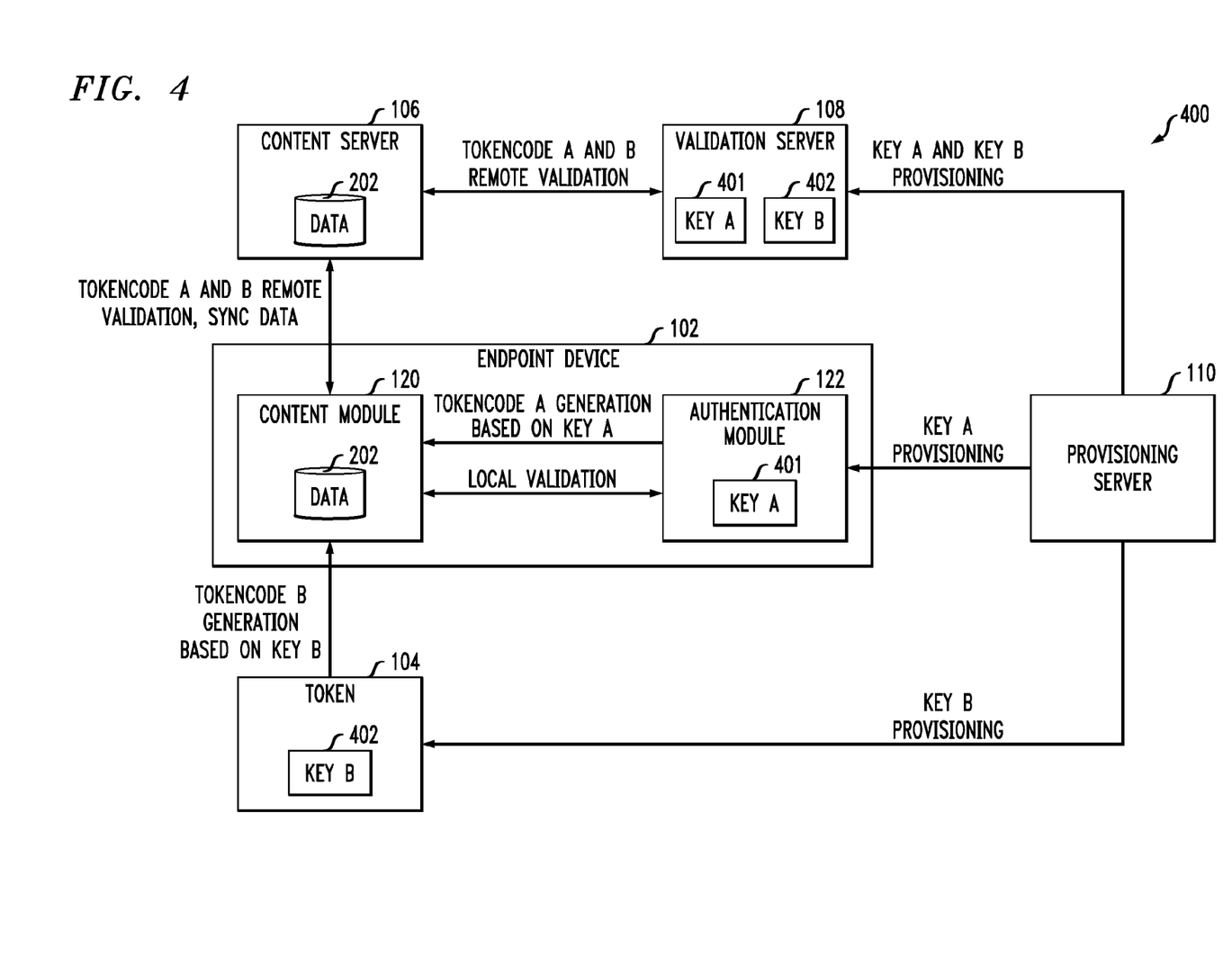
FIG. 4 illustrates another operating configuration of the communication system of FIG. 1 in an illustrative embodiment of the invention.

FIG. 4 shows another exemplary operating configuration 400 of communication system 100. The operating configuration 400 involves endpoint device 102, token 104, content server 106, validation server 108 and provisioning server 110.

In the operating configuration 400, the endpoint device 102 runs a content module 120 and an authentication module 122 in a manner similar to that of operating configuration 200. The content module 120 and content server 106 each store data 202, which includes one or more protected resources and/or data associated with one or more protected resources. The data 202 is synchronized between the content module 120 of endpoint device 102 and the content server 106 using one of or a combination of the techniques described above with respect to operating configuration 200. In some embodiments, the data 202 is stored on the endpoint device 102 only, rather than on both the endpoint device 102 and the content server 106. In these embodiments, both remote and local validation are performed so as to access the data 202 stored on the endpoint device.

The authentication module 122 of endpoint device 102 in operating configuration 400 is configured to generate tokencodes and perform local tokencode validation. As described above, in some embodiments the authentication module runs in a secure hardware and/or software environment, including but not limited to a TPM or TEE.

The provisioning server 110 in the operating configuration 400 is configured to provision keys to validation server 108, authentication module 122 and the token 104. The provisioning server 110 provisions key A 401 and key B 402 to the validation server 108, provisions key A to the authentication module 122, and provisions key B to the token 104. The key A and key B are independent and unique keys. As described above, a given user can be associated with multiple endpoint devices or tokens. In these embodiments, the provisioning server 110 is configured to provision key A and key B to the multiple endpoint devices or tokens.

The endpoint device 102 in operating configuration 400 is configured for both local and remote tokencode validation. As described above, the endpoint device 102 determines whether a network connection is or can be established to a remote server such as content server 106 and validation server 108. If the network connection is or can be established, the endpoint device 102 will perform remote validation of tokencodes.

In contrast to the operating configuration 200, two tokencodes are utilized for remote validation in the operating configuration 400. The token 104 is configured to derive a tokencode B based on or utilizing the key B and the authentication module 122 is configured to derive a tokencode A based on or utilizing the key A. The endpoint device 102 receives tokencode B from the token 104, and the tokencode A from authentication module 122. The endpoint device 102 provides both tokencode A and tokencode B to the content server 106 for remote validation. The content server 106 passes tokencode A and tokencode B to the validation server 108. The validation server 108 is provisioned with key A and key B, and is thus able to validate both tokencode A and tokencode B. The content server 106, on receiving an indication from validation server 108 that tokencode A and tokencode B are validated, permits the endpoint device 102 to access the protected resource.

In some embodiments, the tokencode A is generated based on the tokencode B and thus only the tokencode A is passed to the content server 106 for remote validation by the validation server 108. As an example, the authentication module 122 in endpoint device 102 may generate tokencode A using both key A and tokencode B as inputs.

For offline validation in the operating configuration 400, a variety of techniques may be utilized. For example, the provisioning server 110 in operating configuration 400, although not explicitly shown in FIG. 4, may further provision each of authentication module 122 and token 104 with a key C used for generating tokencode C for local or offline validation. The endpoint device 102 receives tokencode C from the token 104, and passes tokencode C to the authentication module 122 for local validation in a manner similar to that described above with respect to local tokencode validation in the operating configuration 200. As another example, the endpoint device 102 can be provisioned with both key A and key B such that it is able to validate the tokencode B received from token 104 for local or offline validation.

As described above, a user may have multiple endpoint devices and/or multiple tokens. As an example, a user may have two separate tokens which are utilized with a smartphone. The provisioning server 100 can provision the smartphone and each of the tokens with a distinct key, and provision the validating server with all of the keys. For remote validation of tokencodes, the user of the smartphone may use either one of the tokens. The validation server can be configured with validation rules permitting the user to use the smartphone with a first one of the tokens (e.g., accepts tokencodes generated using the key provisioned to the first token and the smartphone) and a second one of the tokens (e.g., accepts tokencodes generated using the key provisioned to the second token and the smartphone).

For added security, the validation server can be configured with validation rules which specify that tokencodes from both the first and second tokens are required for validating access to a resource. Alternatively, different tokens can be provisioned with different keys to access different protected resources. The different tokens may alternatively be associated with different security levels. For example, a first token can be utilized for lower security protected resources or partial access to a protected resource where a second token is used for higher security protected resources of full access to a protected resource.

In other embodiments, a user may have a single token but multiple endpoint devices provisioned with independent keys. In these embodiments, the validation server is configured with validation rules permitting a user to utilize a first tokencode generated by the token and a second tokencode generated by one of the multiple endpoint devices for remote validation of a request for access to a resource.

Authentication module 122 and token 104 may generate the respective tokencodes A and B utilizing respective keys A 401 and B 402 in combination with one or more moving factors. By way of example, key A may be a seed used for generating time-based OTPs, where a given one of the OTPs is the tokencode A. In this example, the moving factor is a time factor. As an alternative, the key A may be a seed used for generating event-based OTPs, where a given one of the OTPs is the tokencode A and the moving factor is a counter value.

Various moving factors, including combinations of moving factors, may be utilized in embodiments of the invention.

Examples of moving factors include a time factor or counter value as discussed above, a server challenge, a user secret, location information of the endpoint device, etc. In some embodiments, the authentication module 122 and token 104 utilize the same or different moving factors for generating tokencode A and tokencode B, respectively. For example, the token 104 may use a time factor and key B for generating tokencode B while the authentication module 122 uses a counter value and key A for generating tokencode A, or vice versa. As another example, both the authentication module 122 and token 104 may use a server challenge as a moving factor for generating tokencode A and tokencode B, respectively. The authentication module 122 and token 104 may also use a combination of moving factors for generating respective tokencodes, where one or more moving factors are common to the authentication module 122 and token 104 and one or more moving factors used by the authentication module 122 and token 104 are different. For example, the authentication module 122 may use the server challenge and a time factor for generating tokencode A while the token 104 uses the server challenge and a counter value for generating tokencode B. The endpoint device 102 and token 104 in operating configuration 200 may similarly using moving factors for generating tokencodes.

For embodiments which utilize moving factors for generating tokencodes, the moving factors should be synched between endpoint device 102, token 104 and/or validation server 108. As an example, if the token 104 generates tokencodes using a time factor, the time factor should by synchronized between the token 104, endpoint device 102 and validation server 108. As will be appreciated, time drift between endpoint device 102, token 104 and/or validation server may occur, and thus result in improper validation or invalidation of a tokencode generated using a time factor. Thus, the endpoint device 102, token 104 and validation server 108 should synchronize their time. Various techniques can be used for time synchronization, including messaging a current time among the devices, synching time with a common time server, etc. Time synchronization may occur periodically, each time a tokencode is to be generated, or at some other interval. For example, if the token 104 and endpoint device 102 connect wirelessly, time synchronization may occur each time the token 104 is brought into close proximity with the endpoint device 102 and a wireless connection is established.

Synchronization of moving factors is not limited solely to time factors. For event-based tokencode generation, counter values should also be synched among endpoint device 102, token 104 and validation server 108. In the operating configuration 200, the authentication module 122 may synchronize two counter values, for example, a first counter value with the token 104 for local tokencode validation and a second counter value with the validation server 108 for remote tokencode validation. Each of the authentication module 122 and token 104 should synchronize respective counter values with the validation server 108.

Figure 5:
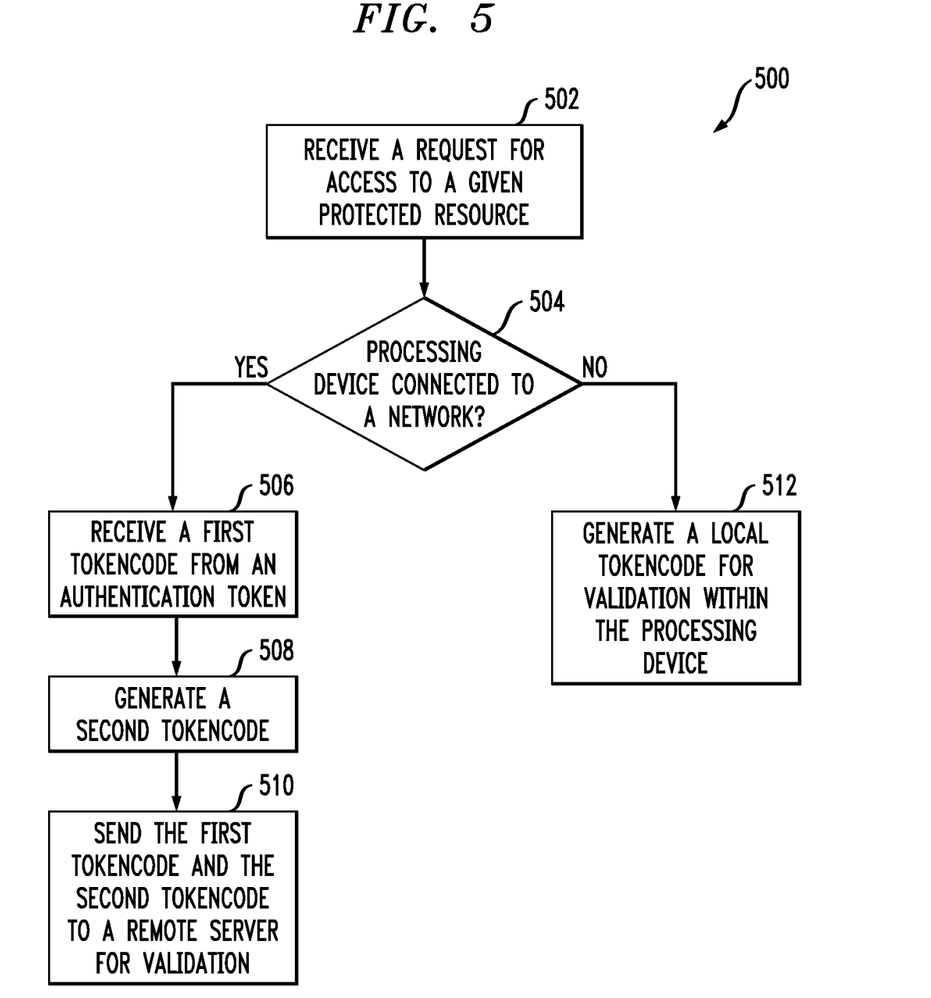
FIG. 5 illustrates another methodology for tokencode validation in an illustrative embodiment of the invention.

FIG. 5 illustrates a methodology 500 for tokencode validation. In step 502, a request is received for access to a given protected resource. As discussed above, the request may be received via user input, generated within an application running on a processing device, from one or more other devices, etc. Next, a determination 504 is made as to whether a processing device, such as endpoint device 102 in operating configuration 400, is connected to a network. In some embodiments, this determination involves determining whether the endpoint device is or can establish a connection to a network. The determination may further comprise determining whether a content or other remote server is online.

If the processing device is connected to the network, methodology 500 continues with step 506, receiving a first tokencode from an authentication token. Next, the processing device generates a second tokencode in step 508. The first tokencode and the second tokencode are sent 510 to a remote server such as validation server 108 in operating configuration 400 for validation. As described above, in some embodiments the first tokencode is used as an input in generating the second tokencode. In these embodiments, step 510 involves sending only the second tokencode to the remote server for validation. If the processing device is not connected to the network, the methodology 500 continues with step 512, generating a local tokencode for validation within the processing device.

In some embodiments, client or application software running on content module 120 of endpoint device 102 determines a security level or sensitivity associated with a particular protected resource. For lower security or low sensitive protected resources, the endpoint device 102 uses a locally generated tokencode or response to a server challenge for accessing remote or local protected resources. For higher security or highly sensitive protected resources, the endpoint device 102 requires the use of token 104 for generating tokencodes for accessing remote or local protected resources.

Other embodiments use endpoint devices for offline authentication to other endpoint devices using one or more of the techniques described above. For example, a user may utilize a smartphone to generate a tokencode to authenticate to client software on a tablet or laptop to access protected offline resources.

Embodiments of the invention provide various advantages relative to conventional techniques. For example, some embodiments do not require an endpoint device or token to store a set of tokencodes which must be periodically refreshed. Endpoint devices in some embodiments of the invention can act as a verifier and authenticator. In addition, both offline or local and online or remote validation can be seamless and transparent to a user.

The ability to store data associated with protected resources both locally and remotely in a content server can provide significant advantages for users. As an example, the data associated with protected resources may be used collaboratively with a number of other users via a shared resource pool or cloud computing platform. Protected resources may include documents, files, data, applications, etc. which may be modified, created or edited by multiple users. Thus, it may be desirable whenever possible to access protected resources which are stored remotely, to allow for real-time editing, updating and collaboration with other users. It may also be desirable to store and synchronize all or part of the protected resource and/or data associated with a protected resource locally so that a user can still access the protected resource securely if a network connection is unavailable or a content server goes offline By way of example, a user who accesses a protected resource using a smartphone may periodically move in and out of coverage areas and desire access to the protected resource or at least some portion thereof even when the user is offline or otherwise unable to connect to the content server.

An endpoint device may store locally only a set of essential features or frequently used data associated with a protected resource while a content server stores a full set of features and data associated with a protected resource. This may be due to memory, processing power, or other constraints or limitations of endpoint devices relative to a remote server or cloud computing platform. In this instance, a user would prefer to access the protected resource remotely, but still desires a failsafe or backup option for accessing at least some part of a protected resource locally while the endpoint device and/or content server is offline.

The ability to store data both locally and remotely in a content server can also be advantageous in the context of enterprise systems. Enterprises may deploy application containers for employees' or customer's own devices in a bring your own device (BYOD) system. The application containers can include a user's email, contacts and calendar as well as enterprise applications and/or a secure file or web browser. To access one of the resources, such as the user's email, authentication is required. In a connected or online mode, user credentials in the form of a tokencode are validated by a backend validation server hosted by the enterprise. After the user is authenticated, existing email is accessible and new email messages are downloaded from a content server. In a non-connected or offline mode, a user will be able to authenticate locally to access emails and attachments which are cached in the endpoint device. Similarly, a user can authenticate either remotely or locally to access other resources in the application container such as a user's contacts or calendar.

The particular processing operations and other system functionality described in conjunction with the FIGS. 2-5 are presented by way of illustrative example only, and should not be construed as limiting the scope of the invention in any way. Alternative embodiments can use other types of processing operations for authentication. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different techniques, as well as combinations of the above-described techniques. For example, particular features described above with respect to a given embodiment are not restricted solely for use in the given embodiment unless otherwise noted. Instead, embodiments of the invention may combine features described above in conjunction with different embodiments.

It is to be appreciated that the tokencode validation and other processing functionality such as that described in conjunction with the FIGS. 2-5 and the associated examples above can be implemented at least in part in the form of one or more software programs stored in memory and executed by a processor of a processing device such as endpoint device 102. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It is to be appreciated that the particular configuration, elements and operating parameters of the embodiments described above are not requirements of the invention, and should not be construed as limiting the scope of the invention in any way. For example, while FIGS. 2 and 4 show an endpoint device 102 which receives a tokencode from token 104, the endpoint device 102 may alternatively receive tokencodes from other endpoint devices not shown or may generate tokencodes internally. As an example, a user may pass tokencodes between a smartphone and a tablet, a smartphone and a laptop, a tablet and a laptop, etc. Those skilled in the art can make these and other modifications in the described embodiments in a straightforward manner.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. An apparatus comprising:
a processing device configured to:
  receive a request for access to a given protected resource;
  receive, from an authentication token, a tokencode for validation in conjunction with the request for access to the given protected resource;
  determine whether the processing device is connected to a network;
  perform online validation responsive to determining that the processing device is connected to the network; and
  perform offline validation responsive to determining that the processing device is not connected to the network by validating the received tokencode in the processing device;
wherein the processing device is configured to perform online validation by one of:
  generating an additional tokencode in the processing device and sending the received tokencode and the additional tokencode to a server over the network for validation; and
  generating an additional tokencode in the processing device based at least in part on the received tokencode and sending the additional tokencode to a server over the network for validation.

2. The apparatus of claim 1, wherein the processing device comprises an authentication module configured to validate the received tokencode in the processing device.

3. The apparatus of claim 2, wherein the authentication module runs in a trusted platform module of the processing device.

4. The apparatus of claim 2, wherein the authentication module runs in a trusted execution environment of the processing device.

5. The apparatus of claim 2, wherein the apparatus further comprises an embedded secure element, and wherein the authentication module runs on the embedded secure element.

6. The apparatus of claim 5, wherein the embedded secure element comprises one of a smartcard and a subscriber identity module card.

7. The apparatus of claim 2, wherein the additional tokencode is generated based at least in part on a cryptographic key provisioned in the authentication module.

8. The apparatus of claim 1, wherein the received tokencode comprises a time-based tokencode and the processing device is configured to synchronize time with the authentication token for use in validating the received tokencode in the processing device and to synchronize time with the server for use in generating the additional tokencode sent to the server for validation.

9. The apparatus of claim 1, wherein the received tokencode comprises an event-based tokencode and the processing device is configured to maintain a first counter for use in validating the received tokencode in the processing device and to maintain a second counter for use in generating the additional tokencode sent to the server for validation, the first counter being different than the second counter.

10. The apparatus of claim 1, wherein the protected resource comprises another processing device.

11. The apparatus of claim 1, wherein the processing device is configured to:
    store data associated with one or more protected resources in a local memory;
    sync the data stored in the local memory with data stored on the server over the network;
    access the data stored on the server responsive to a successful online validation; and
    access the data stored in the local memory responsive to a successful offline validation.

12. The apparatus of claim 11, wherein the processing device is configured to access the local memory without connecting to the network.

13. The apparatus of claim 1, wherein the processing device comprises one of: a smartphone, a tablet, a laptop computing device and a desktop computing device.

14. The apparatus of claim 1, wherein the received tokencode and the additional tokencode are generated using at least one of: independent and unique keys; and different moving factors.

15. A method performed by a processing device comprising:
    receiving a request for access to a given protected resource;
    receiving, from an authentication token, a tokencode for validation in conjunction with the request for access;
    determining whether the processing device is connected to a network;
    performing online validation responsive to determining that the processing device is connected to the network; and
    performing offline validation responsive to determining that the processing device is not connected to the network by validating the received tokencode in the processing device;
    wherein performing online validation comprises one of:
        generating an additional tokencode in the processing device and sending the received tokencode and the additional tokencode to a server over the network for validation; and
        generating an additional tokencode in the processing device based at least in part on the received tokencode and sending the additional tokencode to a server over the network for validation.

16. The method of claim 15, further comprising:
    storing data associated with one or more protected resources in a local memory of the processing device;
    syncing the data stored in the local memory with data stored on the server over the network;
    accessing the data stored on the server responsive to a successful online validation; and
    accessing the data stored in, the local memory responsive to a successful offline validation;
    wherein the local memory is accessible without connecting to the network.

17. An article of manufacture comprising a processor-readable storage medium having processor-readable program code embodied therein, which, when executed by a processor, causes the processor to perform the method of claim 15.

18. The method of claim 15, wherein receiving the tokencode further comprises:
    sending a challenge to the authentication token; and
    receiving the tokencode from the authentication token.

19. A method performed by a processing device comprising:
    receiving a request for access to a given protected resource;
    receiving a tokencode for validating the request for access;
    determining whether the processing device is connected to a network;
    sending the tokencode to a server for validation responsive to determining that the processing device is connected to the network; and
    validating the tokencode in the processing device responsive to determining that the processing device is not connected to the network;
    wherein receiving the tokencode comprises receiving a first tokencode from an authentication token and generating a second tokencode in the processing device;
    wherein sending the tokencode to the server comprises sending the first tokencode and the second tokencode to the server; and
    wherein validation by the server comprises validating the first tokencode and the second tokencode.

20. The method of claim 19, wherein the first tokencode and the second tokencode are generated using independent and unique keys and one or more moving factors, the one or more moving factors comprising at least one of a time value and a counter value.

* * * * *